United States Patent
Hyde

(10) Patent No.: US 7,359,585 B2
(45) Date of Patent: Apr. 15, 2008

(54) PLASMON PHOTOCATALYSIS

(75) Inventor: Roderick A. Hyde, Livermore, CA (US)

(73) Assignee: Searete LLC

( * ) Notice: Subject to any disclaimer, the term of this patent is extended or adjusted under 35 U.S.C. 154(b) by 0 days.

(21) Appl. No.: 11/496,763

(22) Filed: Jul. 31, 2006

(65) Prior Publication Data

US 2007/0017796 A1 Jan. 25, 2007

Related U.S. Application Data

(63) Continuation-in-part of application No. 11/185,925, filed on Jul. 20, 2005, now Pat. No. 7,295,723.

(51) Int. Cl.
- *G02B 6/00* (2006.01)
- *G02B 6/02* (2006.01)
- *G01J 1/04* (2006.01)
- *G01J 1/42* (2006.01)
- *G01J 5/08* (2006.01)

(52) U.S. Cl. .................. 385/12; 385/122; 385/123; 385/147; 250/227.11; 250/227.14; 250/227.18; 250/288; 356/246; 356/300; 356/301; 359/240; 359/244; 359/290; 359/296; 204/403.1

(58) Field of Classification Search .............. 385/12
See application file for complete search history.

(56) References Cited

U.S. PATENT DOCUMENTS

| | | | |
|---|---|---|---|
| 4,481,091 A | 11/1984 | Brus et al. | |
| 5,327,225 A | 7/1994 | Bender et al. | |
| 5,439,652 A | 8/1995 | Sczechowski et al. | |
| 5,606,633 A | 2/1997 | Groger et al. | |
| 5,825,799 A | 10/1998 | Ho et al. | |
| 5,858,799 A * | 1/1999 | Yee et al. | 436/164 |
| 6,539,156 B1 * | 3/2003 | Dickson et al. | 385/129 |
| 2002/0117157 A1 | 8/2002 | Stephan et al. | |
| 2003/0209972 A1 | 11/2003 | Holmes et al. | |
| 2005/0164169 A1 * | 7/2005 | Malak | 435/5 |
| 2005/0237602 A1 | 10/2005 | Yanagisawa | |

OTHER PUBLICATIONS

Barnes, William L.; Dereux, Alain; and Ebbesen, Thomas W.; "Surface Plasmon Subwavelength Optics," Nature: Insight Review Articles; Aug. 14, 2003; pp. 824-830; vol. 424.

Barnes, W.L.; Murray, W.A.; Dintinger, J.; Devaux, E.; and Ebbesen, T.W.; "Surface Plasmon Polaritons and Their Role in the Enhanced Transmission of Light Through Periodic Arrays of Subwavelength Holes In a Metal Film," Physical Review Letters; Mar. 9, 2004; pp. 107401-1-107401-4; vol. 92; No. 10.

Bearinger, J.P.; Hiddessen, A.L.; Wu, K.J.J.; Christian, A.T.,; Dugan, L.C.; Stone, G. Camarero, J.; Hinz, A.K. and Hubbell, J.A.; "Biomolecular Patterining via Photocatalytic Lithography"; Lawrence Livermore National Laboratory hosting Nanotech 2005 in Anaheim, California; May 8, 2005-May 12, 2005; document bearing a date of Mar. 2, 2005; pp. 1-6.

(Continued)

*Primary Examiner*—Frank G Font
*Assistant Examiner*—Ryan Lepisto

(57) ABSTRACT

Plasmons on a waveguide may deliver energy to photocatalyze a reaction. The waveguide or other energy carrier may be configured to carry electromagnetic energy and generate plasmon energy at one or more locations proximate to the waveguide, where the plasmon energy may react chemically with a medium or interaction material.

34 Claims, 10 Drawing Sheets

OTHER PUBLICATIONS

Degiron, A. and Ebbesen, T.W.; "The Role of Localized Surface Plasmon Modes in the Enhanced Transmission of Periodic Subwavelength Apertures," Journal of Optics A: Pure Applied Optics; Jan. 20, 2005; pp. S90-S96; vol. 7; Institute of Physics Publishing Ltd.

Fujishima, Akira; "Discovery and Applications of Photocatalysis—Creating a Comfortable Future by Making Use of Light Energy," Japan Nanonet Bulletin; May 12, 2005; Issue 44; pp. 1-3; Nanotechnology Researches Network Center of Japan; located at http://www.nanonet.go.jp/english/mailmag/2005/044a.html and printed on Jul. 19, 2005.

Hohng, S.C.; Yoon, Y.C.; Kim, D.S.; Malyarchuk, V.; Müller, R.; Lienau, Ch.; Park, J.W.; Yoo, K.H.; Kim, J.; Ryu, H.Y.; and Park, Q.H.; "Light Emission From the Shadows: Surface Plasmon Nano-Optics At Near and Far Fields," Applied Physics Letters; Oct. 21, 2002, pp. 3239-3241; vol. 81; No. 17; American Institute of Physics.

Homola, Jiří; Yee, Sinclair S.; and Gauglitz, Günter; "Surface Plasmon Resonance Sensors: Review," Sensors and Actuators B; bearing a date of 1999; pp. 3-15; vol. 54; Elsevier Science S.A.; printed on Jul. 19, 2005.

Kamat, Prashant V.; "Photoinduced Transformations in Semiconductor—Metal Nanocomposite Assemblies," IUPAC Pure Appl. Chem.; bearing a date of 2002; pp. 1693-1706; vol. 74; No. 9; IUPAC; printed on Jul. 19, 2005.

Kaneko; Masao; Okura; Ichiro; "Photocatalysis," Springer Biophysics: Science & Technology; 2003; 1 page printed (Book contains 244 pages total); ISBN: 3-540-43473-9; page located at http://www.springeronline.com; page printed on Jul. 19, 2005.

Kik, Pieter G.; Martin, Andrea L.; Maier, Stefan A.; and Atwater, Harry A.; "Metal Nanoparticle Arrays For Near Field Optical Lithography," Proceedings of SPIE 2002, pp. 1-7; vol. 4810; printed on Jul. 19, 2005.

Kittel, Charles; "Introduction to Solid State Physics, 8TH Edition"; Nov. 2004; 1 page printed (Book contains 704 pages total); John Wiley & Sons, Inc.; ISBN: 0-471-41526-X; page located at http://www.wiley.com; page printed on Jul. 19, 2005.

Kottman, Jörg P. and Martin, Olivier J.F.; "Plasmon Resonant Coupling in Metallic Nanowires," Optics Express; Jun. 4, 2001, pp. 655-663; vol. 8; No. 12.

Lee, Jae P. and Sung, Myung M.; "A New Patterning Method Using Photocatalytic Lithography and Selective Atomic Layer Deposition," Journal of the American Chemical Society; Jan. 14, 2004; bearing dates of Sep. 28, 2003 and Dec. 12, 2003; pp. 28-29; vol. 126; No. 1.

Lopez, R.; Boatner, L.A.; Haynes, T.E.; Feldman, L.C.; and Haglund, Jr., R.F.; "Synthesis and Characterization of Size-Controlled Vanadium Dioxide Nanocrystals in a Fused Silica Matrix," Journal of Applied Physics; Oct. 1, 2002; pp. 4031-4036; vol. 92; No. 7; American Institute of Physics.

Maier, Stefan A.; Barclay, Paul E.; Johnson, Thomas J.; Friedman, Michelle D.; and Painter, Oskar; "Low-Loss Fiber Accessible Plasmon Waveguide for Planar Energy Guiding and Sensing," Applied Physics Letters; May 17, 2004; pp. 3990-3992; vol. 84; No. 20; American Institute of Physics.

Maier, Stefan A.; Brongersma, Mark L.; Kik, Pieter G.; and Atwater, Harry A.; "Observation of Near-Field Coupling in Metal Nanoparticle Chains Using Far-Field Polarization Spectroscopy," Physical Review B; pp. 193408-1-193408-4; vol. 65; The American Physical Society.

Nikolajsen, Thomas; Leosson, Kristjan; Salakhutdinov, Ildar; and Bozhevolnyi, Sergey I.; "Polymer-Based Surface-Plasmon-Polariton Stripe Waveguides at Telecommunication Wavelengths," Applied Physics Letters; Feb. 3, 2003; bearing dates of Sep. 18, 2002 and Dec. 10, 2002; pp. 668-670; vol. 82; No. 5; American Institute of Physics.

Podolskiy, Viktor A.; Sarychev, Andrey K.; and Shalaev, Vladimir M.; "Plasmon Modes and Negative Refraction in Metal Nanowire Composites," Optics Express; Apr. 7, 2003; bearing dates of Feb. 10, 2003 and Mar. 31, 2003; pp. 735-745; vol. 11, No. 7; OSA.

Podolskiy, Viktor A.; Sarychev, Andrey K.; Narimanov, Evgenii E.; and Shalaev, Vladimir M.; "Resonant Light Interaction with Plasmonic Nanowire Systems," Journal of Optics A: Pure Applied Optics; Jan. 20, 2005; bearing dates of Jun. 3, 2004 and Oct. 6, 2004; pp. S32-S37; vol. 7; Institute of Physics Publishing Ltd.

Rice, Charles V. and Raftery, Daniel; "Photocatalytic Oxidation of Trichloroethylene Using $TiO_2$ Coated Optical Microfibers," Chem. Commun.; bearing dates of Dec. 21, 1998 and Apr. 9, 1999; pp. 895-896.

U.S. Appl. No. 11/496,759, filed Jul. 31, 2006, Roderick A. Hyde.

U.S. Appl. No. 11/496,766, filed Jul. 31, 2006, Roderick A. Hyde.

* cited by examiner

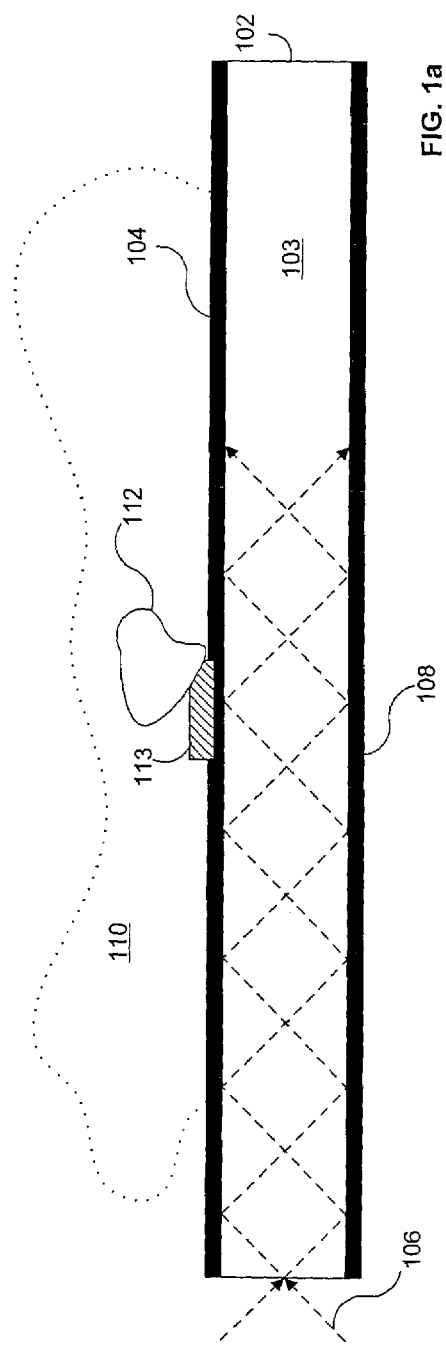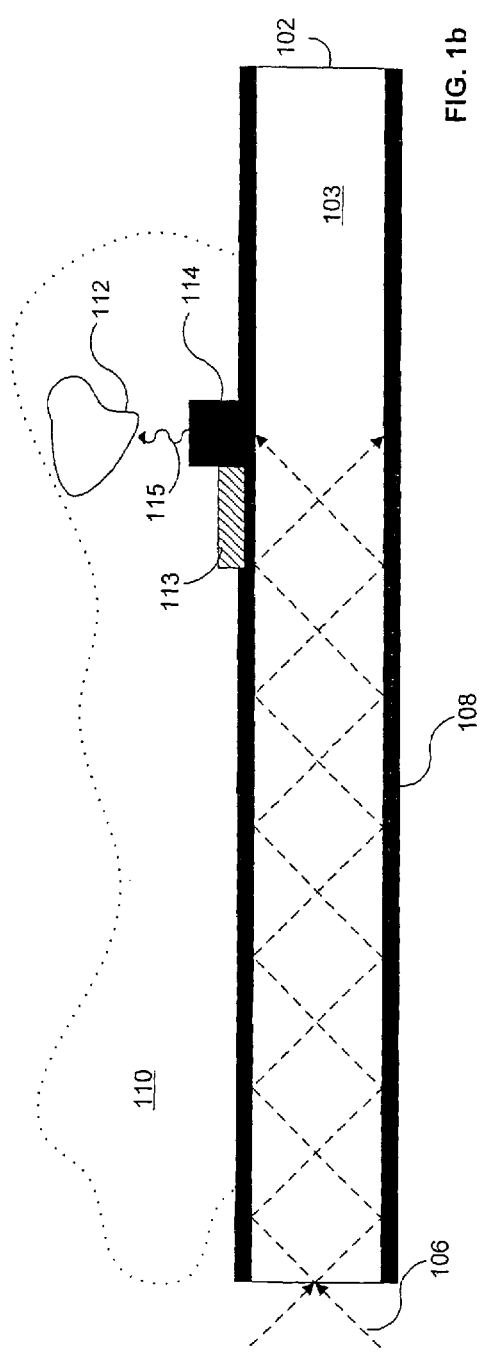

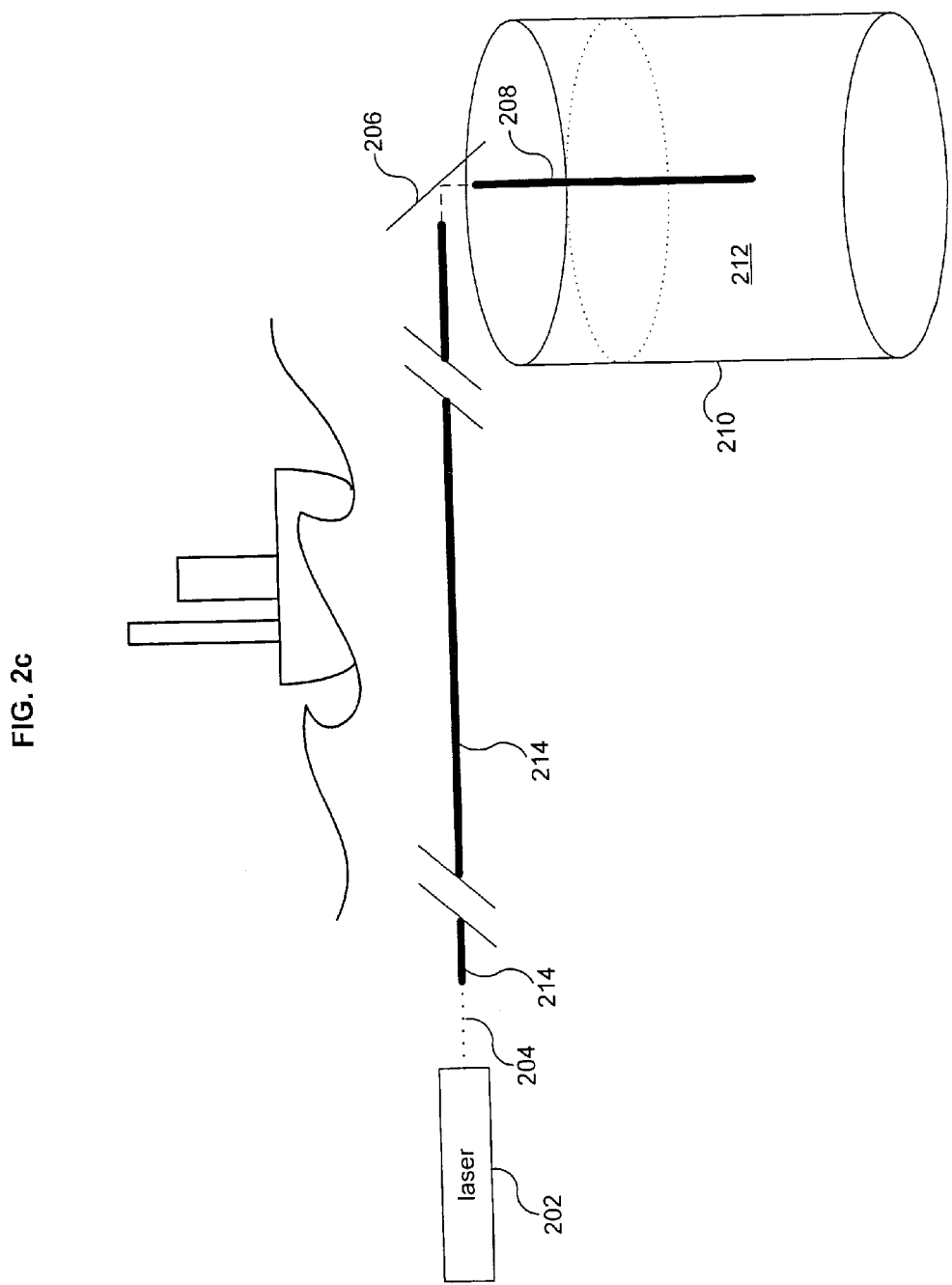

PLASMON PHOTOCATALYSIS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

Related Applications:

For purposes of the USPTO extra-statutory requirements, the present application constitutes a continuation-in-part of U.S. patent application Ser. No. 11/185,925, entitled PLASMON PHOTOCATALYSIS, naming Roderick A. Hyde; as the inventor, filed Jul. 20, 2005 now U.S. Pat. No. 7,295,723, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

The present application relates, in general, to plasmons and photocatalysis.

SUMMARY

A waveguide or other approach may deliver plasmon energy to induce, change the rate of, or otherwise affect a chemical reaction, such as a photocatalytic reaction. In one embodiment, a waveguide includes a conductive layer that converts electromagnetic energy into plasmon energy. A portion of the waveguide and/or the conductive layer may have variations configured to produce and/or support plasmons. In one embodiment, the waveguide is incorporated in a system that may include an energy source and/or elements configured to direct and/or focus the energy.

BRIEF DESCRIPTION OF THE FIGURES

FIG. 1a shows a waveguide with a conductive layer, a plasmon propagating on the outer surface of the conductive layer, and a photocatalyst in the field of the plasmon.

FIG. 1b shows a waveguide with an outer conductive layer, a plasmon propagating on the outer surface of the conductive layer, and a defect on the conductive layer that converts plasmons into electromagnetic energy.

FIG. 2c shows a laser with a fiber that extends over a long distance to a vessel with a material in it.

DETAILED DESCRIPTION

Methods for interacting electromagnetic energy with matter are known; for example, in U.S. Pat. No. 4,481,091 entitled CHEMICAL PROCESSING USING ELECTROMAGNETIC FIELD ENHANCEMENT to Brus, et al., which is incorporated herein by reference. Specifically, electromagnetic energy may be delivered to a spatial position in order to induce a photocatalytic reaction, as described in U.S. Pat. No. 5,439,652 entitled USE OF CONTROLLED PERIODIC ILLUMINATION FOR AN IMPROVED METHOD OF PHOTOCATALYSIS AND AN IMPROVED REACTOR DESIGN to Sczechowski, et al., which is incorporated herein by reference.

Further, electromagnetic energy may be delivered to a given area using surface plasmons. Surface plasmons have been used as sensors, as described in J. Homola, S. S. Yee, and G. Gauglitz, "Surface plasmon resonance sensors: review", Sensors and Actuators B, Volume 54, 1999, 3-15, which is incorporated herein by reference. One type of surface plasmon resonance sensor uses optical waveguides. In this technique, electromagnetic energy propagates down a metal-coated waveguide, a portion of the electromagnetic energy couples to an evanescent wave in the metal coating, and the evanescent wave couples to plasmons on the outer surface of the metal. Surface plasmons may exist on a boundary between two materials when the real parts of their dielectric constants $\in$ and $\in'$ have different signs, for example between a metal and a dielectric.

Figure 1C:
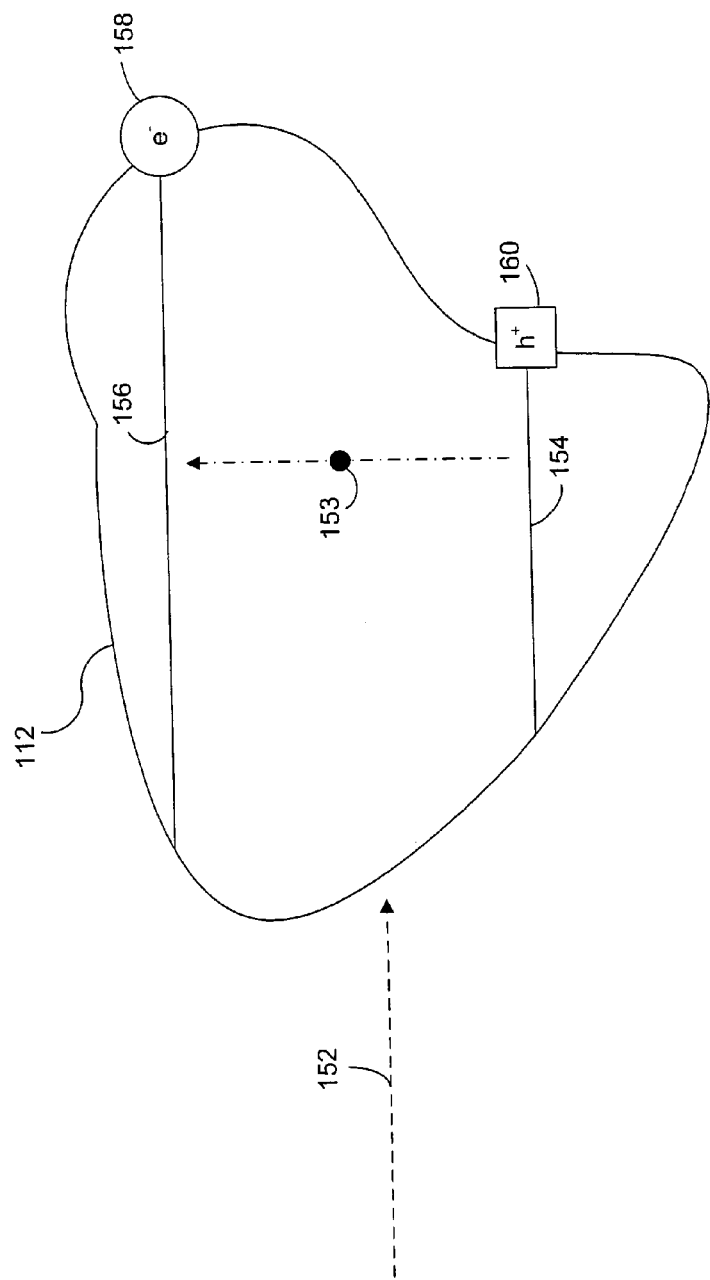
FIG. 1c shows a photocatalyst with energy incident on it, having a band gap between energy levels.

In a first embodiment, shown in FIG. 1a, a waveguide 102 includes an outer conductive layer 104. Electromagnetic energy 106 is coupled into the waveguide 102 and propagates in the waveguide 102. This electromagnetic energy couples to an evanescent wave in the conductive layer 104, which couples to a plasmon 113 on an outer surface 108 of the conductive layer 104. The conductive layer 104 forms a boundary with an interaction material 110. The conductive layer 104 may be a high conductivity metal such as silver, gold, or copper, or it may be another type of metal or conductive material. The waveguide may be an optical fiber, a 2$d$ dielectric slab waveguide, or another kind of waveguide. Metal-coated fibers are known to those skilled in the art and various methods exist for coating a fiber with metal, including vacuum evaporation and sputtering.

In one embodiment, a chemical reaction is induced by the plasmons 113. In one embodiment, the chemical reaction is a photocatalytic reaction. In this embodiment, the interaction material 110 may include a photocatalyst 112. Plasmon energy may be delivered to the photocatalyst 112 by placing the photocatalyst 112 substantially in the field of the plasmon 113. Plasmon energy may also be delivered to the photocatalyst by causing the plasmon 113 to radiate electromagnetic energy 115, for example by forming a defect 114 on the surface of the conductive layer, as shown in FIG. 1$b$. Although the defect 114 in FIG. 1$b$ is shown as extending from the conductive layer 104, in other embodiments the defect may be a deficit of material, may include material or defect integral to the conductive layer 104, material that is not in intimate contact with the conductive layer 104, or any other material or structure known to produce electromagnetic energy responsive to plasmon energy.

Although the outer layer 104 is described as a conductive layer in the exemplary embodiments of FIGS. 1$a$ and 1$b$, it is not necessary for the layer 104 to be conductive for plasmons 113 to be induced at the interface between layer 104 and the interaction material 110. Plasmons may occur in other configurations. For example, if the real parts of the dielectric constants ($\in$ and $\in'$) of layer 104 and the interaction material 110 have opposite signs at the interface, plasmons can be produced and one skilled in the art may find a number of configurations and material configurations that establish these conditions.

The outer layer may, in one embodiment, comprise vanadium dioxide, which is known to undergo an insulator-to-metal or semiconductor-to-metal phase transition at a certain temperature, as described in R. Lopez, L. A. Boatner, T. E. Haynes, L. C. Feldman, and R. F. Haglund, Jr., "Synthesis and characterization of size-controlled vanadium dioxide nanocrystals in a fused silica matrix", Journal of Applied Physics, Volume 92, Number 7, Oct. 1, 2002, which is incorporated herein by reference. By incorporating vanadium dioxide into the structure, the ability to produce plasmons could be switched on or off depending on the temperature of the material.

In the above description of the generation of plasmons in the waveguide, the plasmons are generated by a guided optical wave, typically through total internal reflection or other guiding or partially guiding approaches in a fiber. Other methods of coupling an electromagnetic wave to a plasmon are possible, some of which are described in W. L. Barnes, A. Dereux, and T. W. Ebbesen, "Surface plasmon subwavelength optics", Nature, Volume 424, Aug. 14, 2003, 924-830, which is incorporated herein by reference. These methods include and are not limited to prism coupling, scattering from a topological defect on the surface on which the plasmon is to be generated, and periodic corrugation in the surface on which the plasmon is to be generated. These methods may be used to generate plasmons at any point along the waveguide. FIG. 1$a$ shows plasmons occurring as surface plasmons at the interface between the layer 104 and the interaction material 110, but plasmons may occur in other spatial locations. Plasmons may also occur at the interface between the layer 104 and the inner material 103 of the waveguide, or they may occur within a material. Plasmons are described in C. Kittel, "Introduction to Solid State Physics", Wiley, 1995, which is incorporated herein by reference.

Generally, photocatalysis is the change in the rate of a chemical reaction in the presence of electromagnetic energy. Many different types of photocatalytic reactions exist. In some types of photocatalysis, the electromagnetic energy directly interacts with the reagents (e.g., by raising a molecule to an excited state, thereby increasing its reactivity). In other cases, the interaction is indirect, with the electromagnetic energy activating an intermediate material which then induces the desired reaction (e.g., by creating an electromagnetic pair in a semiconductor, leading to an activated reaction surface). In photocatalysis, the electromagnetic energy may directly supply the reaction's driving energy, or it may indirectly enable a self-energized reaction (e.g., rhodopsin activated phototransduction in the eye). More detailed description of photocatalysis can be found in Masao Kaneko and Ichiro Okura, "Photocatalysis: Science and Technology", Springer-Verlag, 2002; and photocatalytic properties and processes involving plasmons can be found, for example, in P. V. Kamat, "Photoinduced transformation in semiconductor-metal nanocomposite assemblies", Pure & Applied Chemistry, Volume 74, Number 9, 2002, pages 1693-1706; each of which is incorporated herein by reference.

A simplified example of a mechanism by which photocatalysis may occur is illustrated in FIG. 1$c$, where electromagnetic energy 152 is incident on a photocatalyst 112. In the embodiment shown in FIG. 1$c$, the electromagnetic energy 152 may include energy in the form of a plasmon 113 or in the form of radiated electromagnetic energy 115 as shown in FIGS. 1$a$ and 1$b$, or it may include a combination of both. In the case where the electromagnetic energy 152 includes energy in the form of a plasmon 113, the electromagnetic energy may include a portion of the plasmon field that extends into the material 110 and/or a portion of the plasmon field that extends into the layer 104, or it may include a different portion of the plasmon field. The electromagnetic energy 152 causes an electron 153 to move from the valence band 154 to the conduction band 156 of the photocatalyst 112, creating an electron-hole pair, e– 158 and h+ 160.

The photocatalyst 112 may be chosen according to the frequency of electromagnetic energy 152 that is incident on it. For example, the photocatalyst 112 may be chosen to be one having an energy gap between the valence band 154 and the conduction band 156 corresponding to the energy of the incident electromagnetic energy 152. Or, for a given photocatalyst 112, the energy of the incident electromagnetic energy may be chosen to match the energy gap between the valence band 154 and the conduction band 156. As previously described, plasmon energy may be delivered to the photocatalyst 112 by placing the photocatalyst 112 substantially in the field of the plasmon 113, or it may also be delivered to the photocatalyst 112 by causing the plasmon 113 to radiate electromagnetic energy 115. A wide range of general applications of photocatalysis are described later in this application.

Figure 1D:
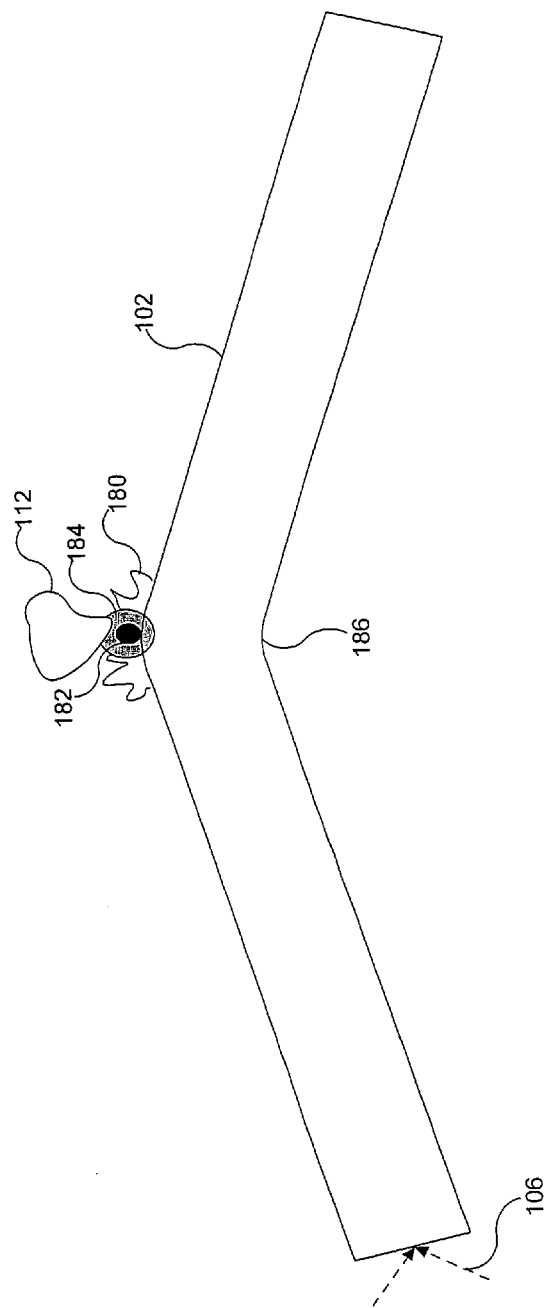
FIG. 1d shows a bent fiber waveguide with a particle near the bend and a photocatalyst near the particle.

FIG. 1$d$ shows an embodiment where the waveguide 102 is an optical fiber that does not have a conductive layer 104. In this embodiment, the waveguide 102 includes an electromagnetic field 180 outside the waveguide, where there exists a metal nanoparticle 182. The electromagnetic field 180 couples to plasmons 184 on the nanoparticle 182, and the plasmons 184 on the nanoparticle 182 may deliver energy to a photocatalyst 112. Creation of plasmons on a particle in an electromagnetic field is described in P. G. Kik, A. L. Martin, S. A. Maier, and H. A. Atwater, "Metal nanoparticle arrays for near field optical lithography", Proceedings of SPIE, 4810, 2002 which is incorporated herein by reference. Such a configuration may be useful, for example, in photocatalytic lithography. In the embodiment shown in FIG. 1d, the waveguide 102 is an optical fiber and the electromagnetic field 180 outside the fiber is created by a bend 186 in the fiber, such a bend being known to cause electromagnetic energy to leave the fiber. The waveguide 102 may, in other embodiments, be a different kind of waveguide, and electromagnetic energy 180 may be incident on the nanoparticle 182 from the waveguide 102 via ways other than a bend in a fiber.

Figure 2B:
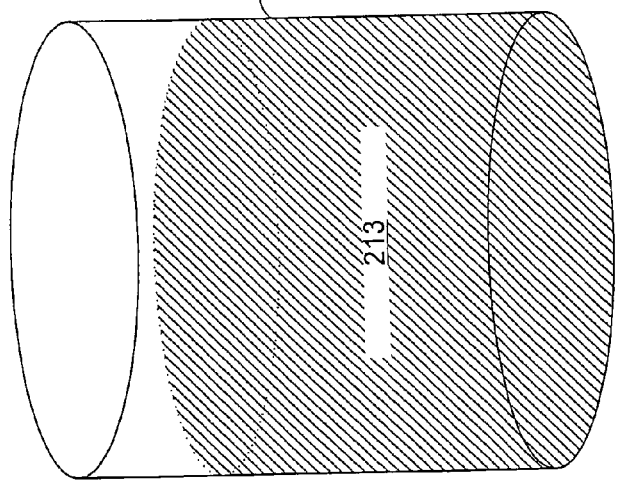
FIG. 2b shows the vessel with material after photocatalysis.
Figure 2A:
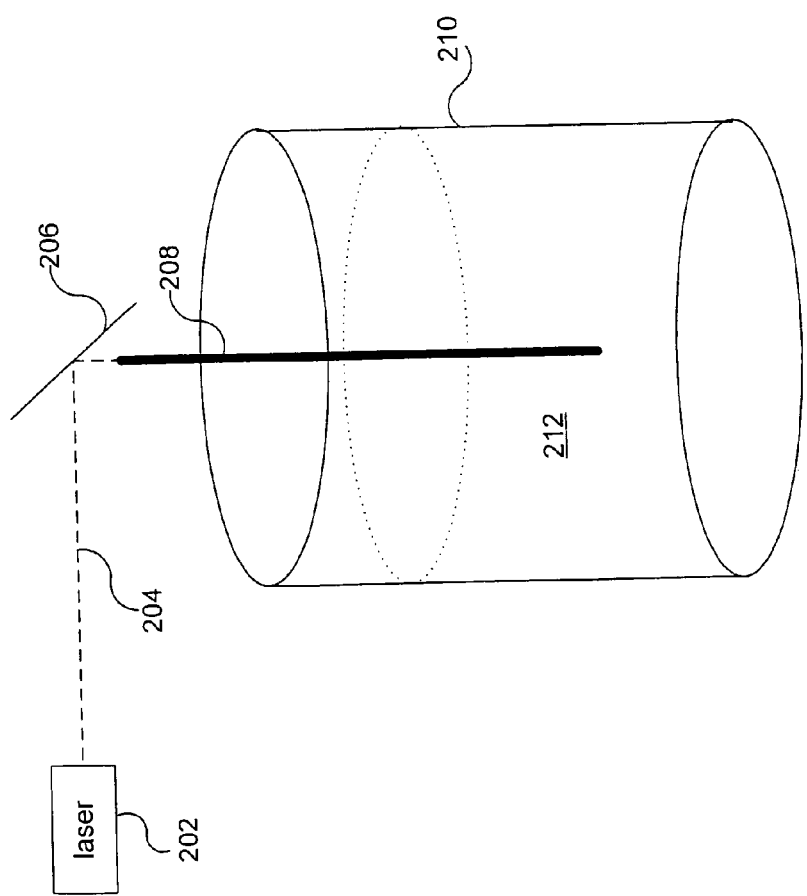
FIG. 2a shows a vessel with material and a waveguide, where a laser emits electromagnetic energy that is reflected from a mirror into the waveguide.

In one embodiment, shown in FIG. 2a, a laser 202 that emits electromagnetic energy in a first wavelength band provides electromagnetic energy 204. Various methods exist for coupling electromagnetic energy into a waveguide, and those skilled in the art will be familiar with the various methods for guiding and coupling electromagnetic energy. In the embodiment shown in FIG. 2a, the emitted electromagnetic energy 204 is reflected from a mirror 206 into the waveguide 208 that, in turn, guides the electromagnetic energy 204 into or near to a vessel 210 configured to hold an interaction material 212. The interaction material 212 may be any state of matter including but not limited to a solid, liquid, gas, or plasma. The interaction material before photocatalysis 212 is shown in FIG. 2a and the interaction material after photocatalysis 213 is shown in FIG. 2b. Although FIGS. 2a and 2b are drawn with a vessel 210, the vessel is not critical and the waveguide may be configured to deliver energy to, for example, ground water or another environment in which the material that receives energy from the waveguide does not require a vessel.

Although a mirror 206 is shown here as an example of an optical element that may be used to direct energy into the waveguide, in some cases different or additional optical elements may be used, such as lenses, polarizers, filters, or other elements, which may be used alone or in combination. Further, the preceding list refers to elements typically associated with optical wavelengths of energy, and for other wavelength bands different elements may be required for directing and focusing the energy. Moreover, in various embodiments, the source of electromagnetic energy may be formed integrally with other elements, may be coupled evanescently to a waveguide, may be a pigtailed assembly, or may be any other configuration for producing the appropriate coupled electromagnetic energy. Moreover, although a single laser 202 is presented in FIG. 2a, more than one source of electromagnetic energy may be coupled to the waveguide 208. For example two or more lasers may be coupled to the waveguide 208. Such lasers may be of a common wavelength or may, in some configurations, have different wavelengths, depending upon various design considerations.

FIG. 2a shows the source of electromagnetic energy being a laser 202 that is outside the waveguide 208. In other embodiments the source of electromagnetic energy may be inside the waveguide 208, or there may be a source or sources outside the waveguide 208 and/or a source or sources inside the waveguide 208. Sources of electromagnetic radiation that may be included in a waveguide are known to those skilled in the art, and may include a microcavity semiconductor laser such as that described in U.S. Pat. No. 5,825,799, to Seng-Tiong Ho, Daniel Yen Chu, Jian-Ping Zhang, and Shengli Wu, which is incorporated herein by reference.

FIG. 2c shows a case similar to that in FIG. 2a, but where electromagnetic energy 204 is configured to travel some distance to the interaction material 212. In one case, the electromagnetic energy is guided by a preliminary waveguide 214, where the preliminary waveguide 214 may be an optical fiber configured to guide electromagnetic energy over distances of thousands of miles or more. The waveguide may be continuous, where the preliminary waveguide 214 is substantially the same as the waveguide 208, or, as shown in FIG. 2c, the waveguide may be discontinuous, and may possibly include elements such as the mirror 206 shown in FIG. 2c. In other embodiments, the preliminary waveguide 214 may be configured to guide the electromagnetic energy over shorter distances, for example, distances on the order of meters. In other embodiments, there may be no preliminary waveguide 214, and the electromagnetic energy may travel in free space to the waveguide 208.

In one embodiment, the electromagnetic energy is in the visible or UV portion of the electromagnetic spectrum. In this case, the waveguide may be an optical fiber, an integrated waveguide, a polymeric waveguide, or any other waveguide suited for such energy. The optical fiber may comprise a graded index of refraction or a step index of refraction, or the optical fiber could be another of the many types of optical fibers known to those skilled in the art. In the case of electromagnetic energy in the UV portion of the electromagnetic spectrum, the waveguide may comprise quartz.

In another embodiment, the waveguide may comprise a photonic band-gap material and/or a photonic band-gap like structure. One example of such a guide may be found in S. A. Maier, P. E. Barclay, T. J. Johnson, M. D. Friedman, and O. Painter, "Low-loss fiber accessible plasmon waveguide for planar energy guiding and sensing," Applied Physics Letters, Volume 84, Number 20, May 17, 2004, 3990-3992, which is incorporated herein by reference, where a waveguide is formed from a silicon membrane having a two-dimensional pattern of gold dots patterned on one side of the substrate. The patterned gold dots constrain propagating electromagnetic energy to the silicon by forming a photonic band gap, and also allow plasmons to propagate along the array of gold dots. The size and spacing of the gold dots affect the guiding properties of the waveguide. While the exemplary embodiment above implements a waveguide and plasmon generator with a photonic bandgap material in a particular arrangement, a variety of other configurations employing photonic bandgap materials may be implemented. In some approaches the photonic bandgap structure and plasmon generating structure may be integral, while in other approaches, the photonic bandgap material may be arranged primary for guiding and a second structure can be combined to produce plasmons responsive to the guided energy.

Figure 3B:
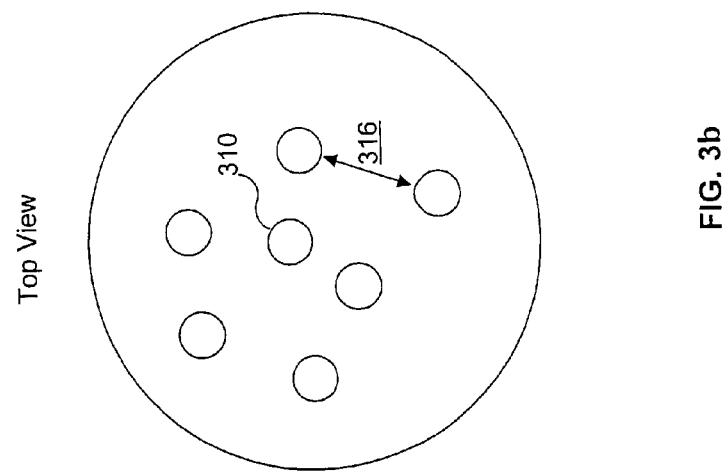
FIG. 3b shows a top view of the array of waveguides.
Figure 3A:
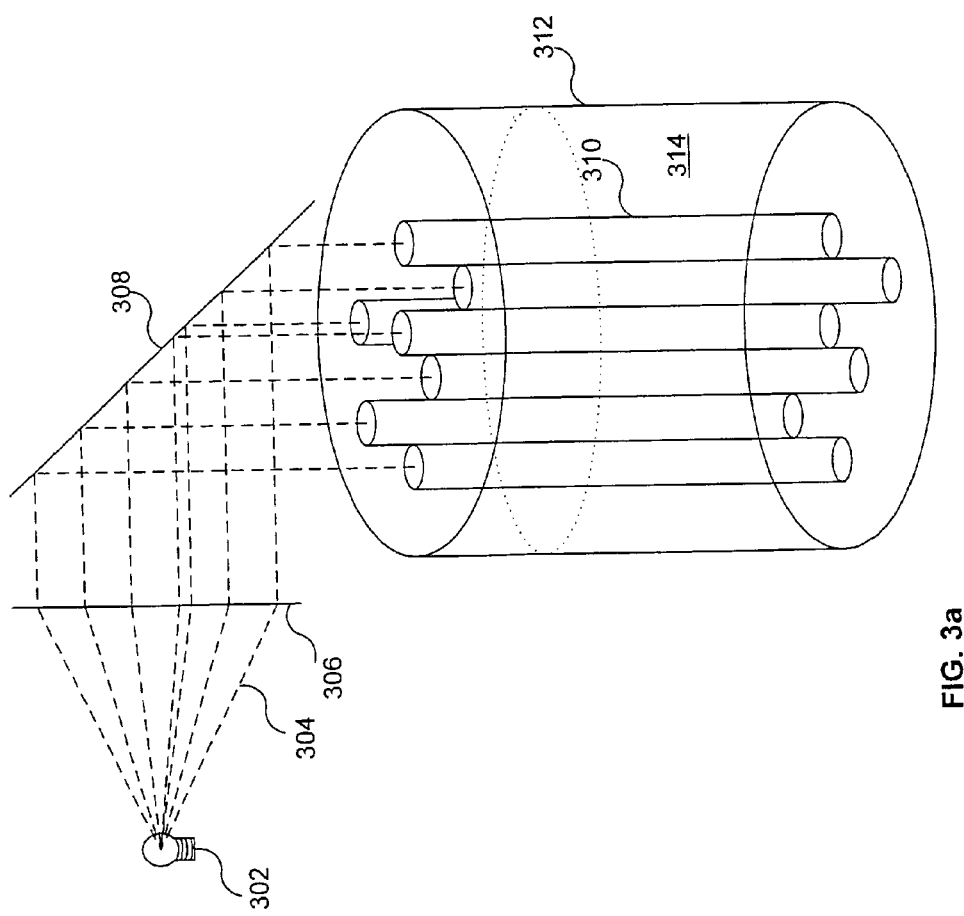
FIG. 3a shows a source of electromagnetic energy, a mirror, and a vessel that holds an array of waveguides, where the electromagnetic energy reflects off the mirror into the wave guides.

In another embodiment, shown in FIG. 3a, a source 302 produces electromagnetic energy 304. Optical elements 306, 308 (in this case, a converging lens 306 and a mirror 308) direct the energy to an array of waveguides 310. Although the array 310 in FIG. 3 is shown having seven waveguides, it may have any number of waveguides. A vessel 312 is configured to hold the array of waveguides 310 and a material 314 that reacts with electromagnetic energy. Although FIG. 3a is drawn with a vessel 312, the vessel is not critical and the array of waveguides may be configured to deliver energy to, for example, ground water or another environment in which the material that receives energy from the fibers does not require a vessel.

The waveguides in the array may be configured so that the distribution of energy near the waveguides depends on the separations 316 between the waveguides (illustrated in FIG. 3*b*). Such an energy dependence was demonstrated in J. P. Kottmann and O. J. F. Martin, "Plasmon resonant coupling in metallic nanowires", Optics Express, Volume 8, Number 12, Jun. 4, 2001; V. A. Podolskiy, A. K. Sarychev, and V. M. Shalaev, "Plasmon modes and negative refraction in metal nanowire composites", Optics Express, Volume 11, Number 7, Apr. 7, 2003; S. A. Maier, M. L. Brongersma, P. G. Kik, and H. A. Atwater, "Observation of near-field coupling in metal nanoparticle chains using far-field polarization spectroscopy", Physical Review B, Volume 65, page 193408; and V. A. Podolskiy, A. K. Sarychev, E. E. Narimanov, and E. M. Shalaev, "Resonant light interaction with plasmonic nanowire systems", Journal of Optics A, Volume 7, S32-S37, Jan. 20, 2005; each of which is incorporated herein by reference.

For example, plasmon modes of waveguides were shown to interact under certain conditions. Placing waveguides in relatively close proximity can create relatively high field strengths between the waveguides, so the reacting material 314 may be placed in the region where a high field strength is expected to induce or speed up a reaction. Further, the plasmon modes (spatial distribution and excitation frequency) may be a function of the number, type, and separation of the plasmon waveguides, so the location, distribution, and/or type of the reacting material 314 may be chosen according to the modes excited in the array. The array may be a random array, possibly characterized by an average separation 316 between waveguides, or it may be a substantially ordered array, possibly having separations 316 between waveguides characterized by a mathematical formula. Although the references above describe plasmons on a wire or arrays of conducting dots, plasmons on different kinds of waveguides, such as a metal-coated fiber, may also interact. Further, although FIGS. 3*a* and 3*b* show the waveguides not touching, crossing, joining, or intersecting, in some embodiments it may be desirable for the waveguides to be non-parallel, and the waveguides may in some cases touch, cross, join, or intersect, depending on the particular design.

Figure 4:
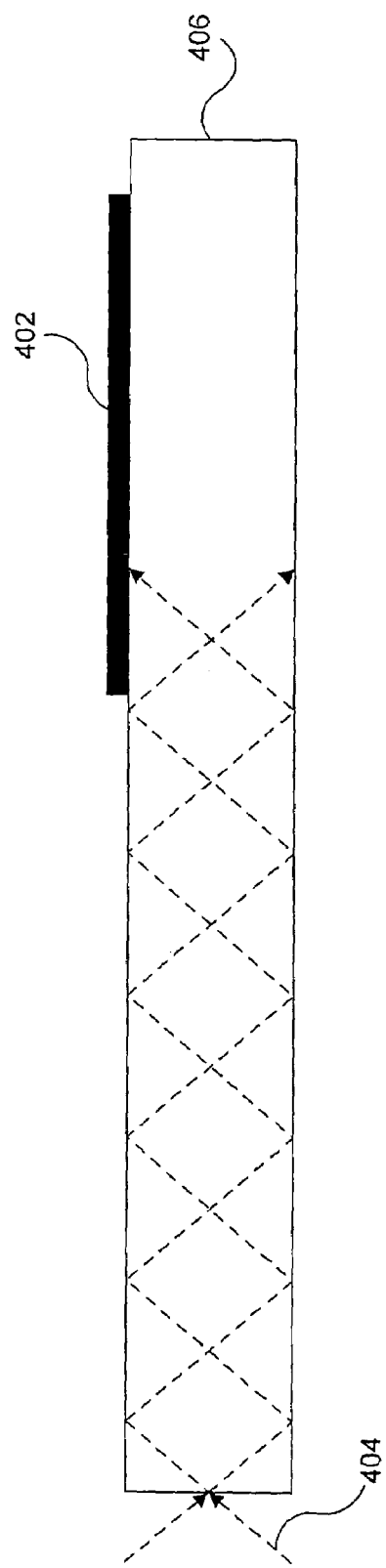
FIG. 4 shows a waveguide that is partially covered with a conductive layer.

In some embodiments, the waveguide may be completely coated with a conductor, as shown in FIG. 1. However, it may be desirable in other embodiments to only partially cover the waveguide with a conductor, as shown in FIG. 4. In the embodiment shown in FIG. 4, electromagnetic energy 404 is directed into the waveguide 406. A portion of the waveguide 406 is covered with a conductor 402, and surface plasmons may be created on the surface of the conductor 402. Although FIG. 4 shows a waveguide having a single portion of the waveguide coated with a conductor, in other embodiments more than one portion of the waveguide may be coated with a conductor.

Figure 5:
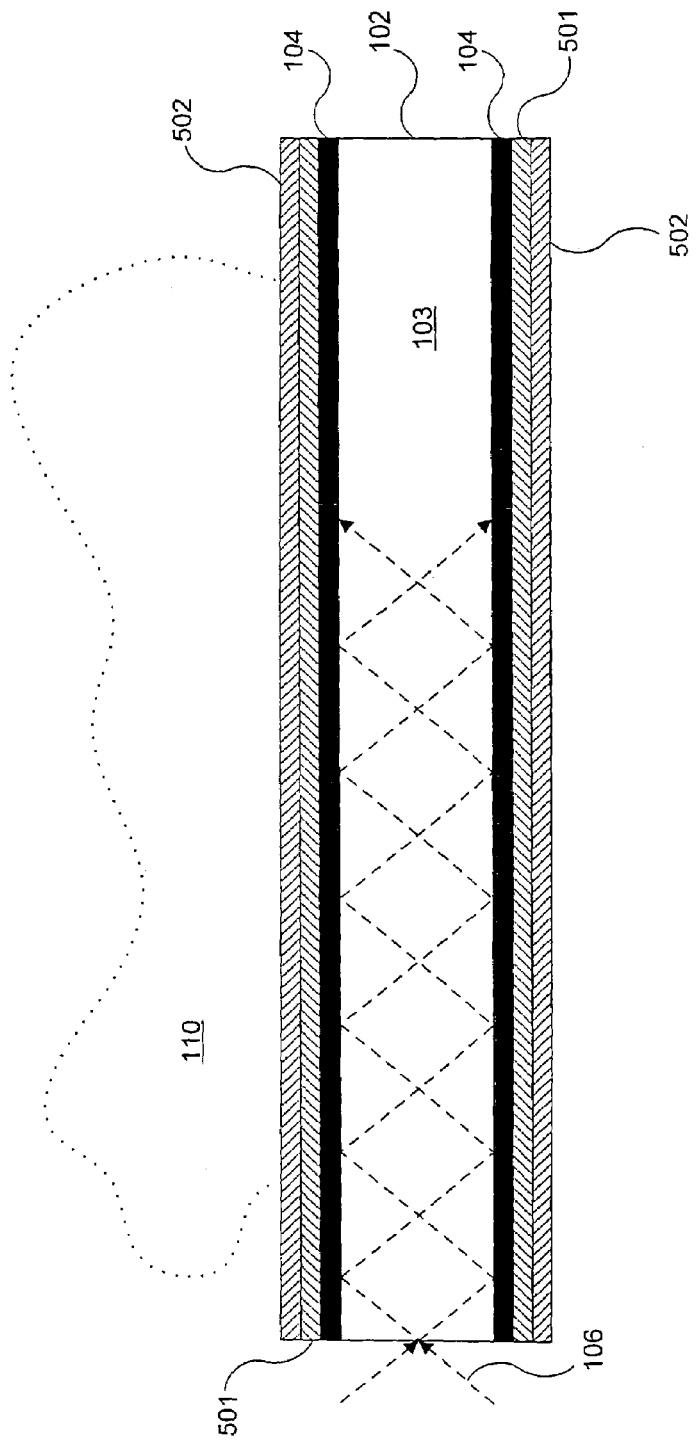
FIG. 5 shows a waveguide that has a conductive layer, a dielectric layer, and a photocatalyst layer, where the waveguide is near an interaction material.

FIGS. 1*a* and 1*b* show examples of configurations in which a photocatalyst 112 is near the outer surface 108 of the conductive layer 104. It may also be possible for the photocatalyst 112 to be joined to the waveguide 102. FIG. 5 shows a waveguide 102 having a conductive layer 104, a dielectric layer 501 in intimate contact with the conductive layer 104, and a photocatalyst layer 502 in intimate contact with the dielectric layer 501. FIG. 5 shows the dielectric layer 501 and the photocatalyst layer 502 as being continuous, but this need not be the case and in some cases the conductive layer 104, the dielectric layer 501, and/or the photocatalyst layer 502 may only partially cover the waveguide, possibly in a periodic or semi-periodic array.

The thicknesses and materials of the layers 104, 501, and 502 may be chosen to produce plasmons in the layer 501 that interact with the photocatalyst layer 502. The layer 501 is described as a dielectric layer, however in a different configuration the layers 104 and 501 may be a different combination of materials for which plasmons exist at the interface, as previously described.

Figure 6:
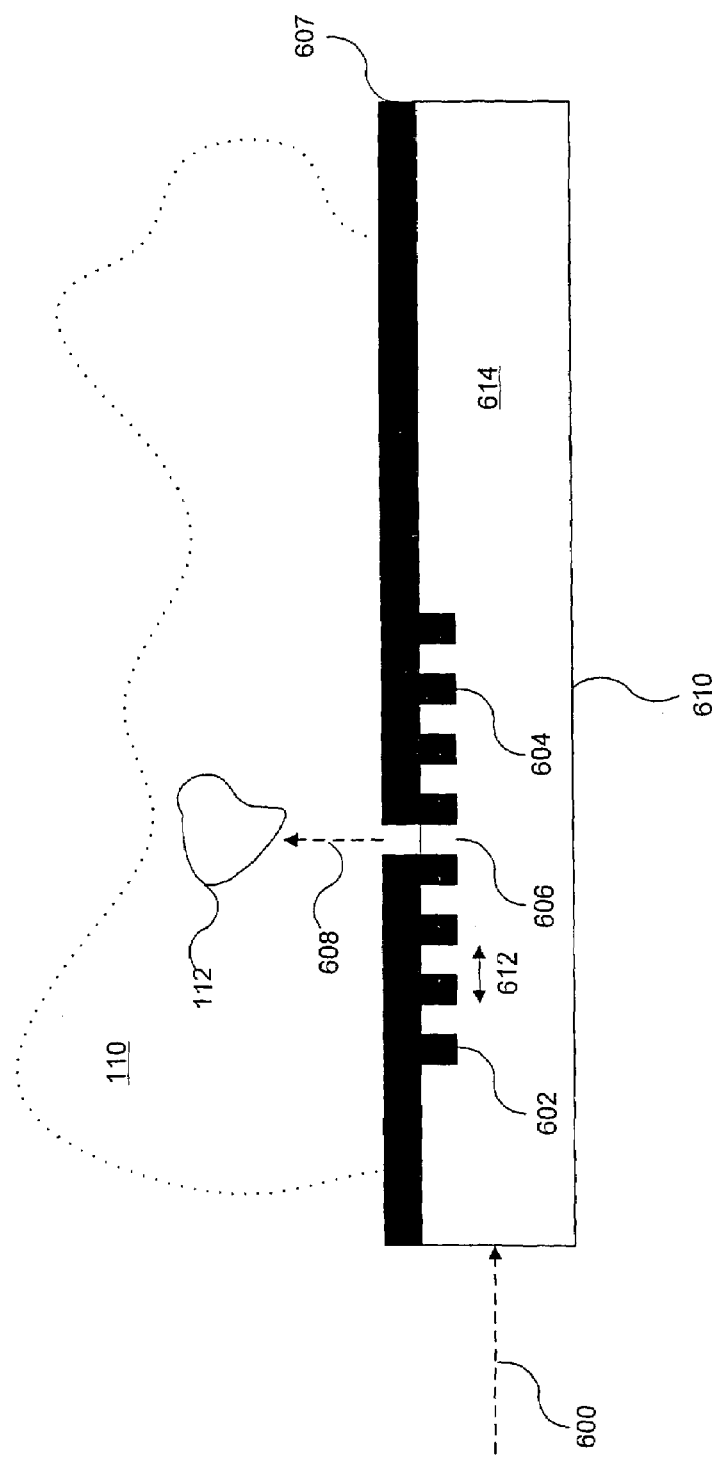
FIG. 6 shows a waveguide having a conductive layer with an aperture, where the aperture is bordered by a grating.

In an arrangement shown in FIG. 6, the configuration may be used to deliver energy to a location, such as a location containing a photocatalyst 112, using a waveguide. In this approach a set of gratings 602, 604 are positioned beside a sub-wavelength aperture 606 in a conductive layer 607. As described for example in A. Degiron and T. W. Ebbeson, "The role of localized surface plasmon modes in the enhanced transmission of periodic subwavelength apertures", Journal of Optics A: Pure Applied Optics, Volume 7, Jan. 20, 2005, pages S90-S96, incorporated herein by reference, such gratings can produce plasmons 113 that then couple through an aperture 606 and thereby increase throughput of electromagnetic energy 608 through the aperture 606. By integrating this configuration with a waveguide 610, energy can couple from the waveguide to locations outside of the waveguide.

FIG. 6 is shown with only one aperture in the conductive layer 607, however it may be desirable to have more than one aperture 606 in the conductive layer 607. In one approach, each of a plurality of apertures is surrounded by respective gratings 602, 604. Further, the gratings 602, 604 are shown having four periods, but the number of periods may depend on the particular application. As described in Degiron, the wavelength(s) corresponding to the maximum transmission of energy through the aperture 606 may depend on the period 612 of the gratings 602, 604, the dielectric constant of the gratings 602, 604, and the dielectric constant of the surrounding materials 110, 614. The gratings 602, 604, although shown only on the interface between the conductive layer 607 and the material 614, may be on the interface between the conductive layer 607 and the material 110, or they may be on both interfaces. The gratings 602, 604 may have periodic variations that are substantially parallel to each other, or the gratings 602, 604 may extend radially from the aperture 606. The aperture 606 is described as being sub-wavelength, but transmission of energy 608 may occur in configurations having apertures that are equal to or larger than the wavelength of transmitted energy 608. Although a photocatalyst 112 is shown as receiving the energy from the aperture 606, it may be desirable for another type of material to react with the energy.

Figure 7:
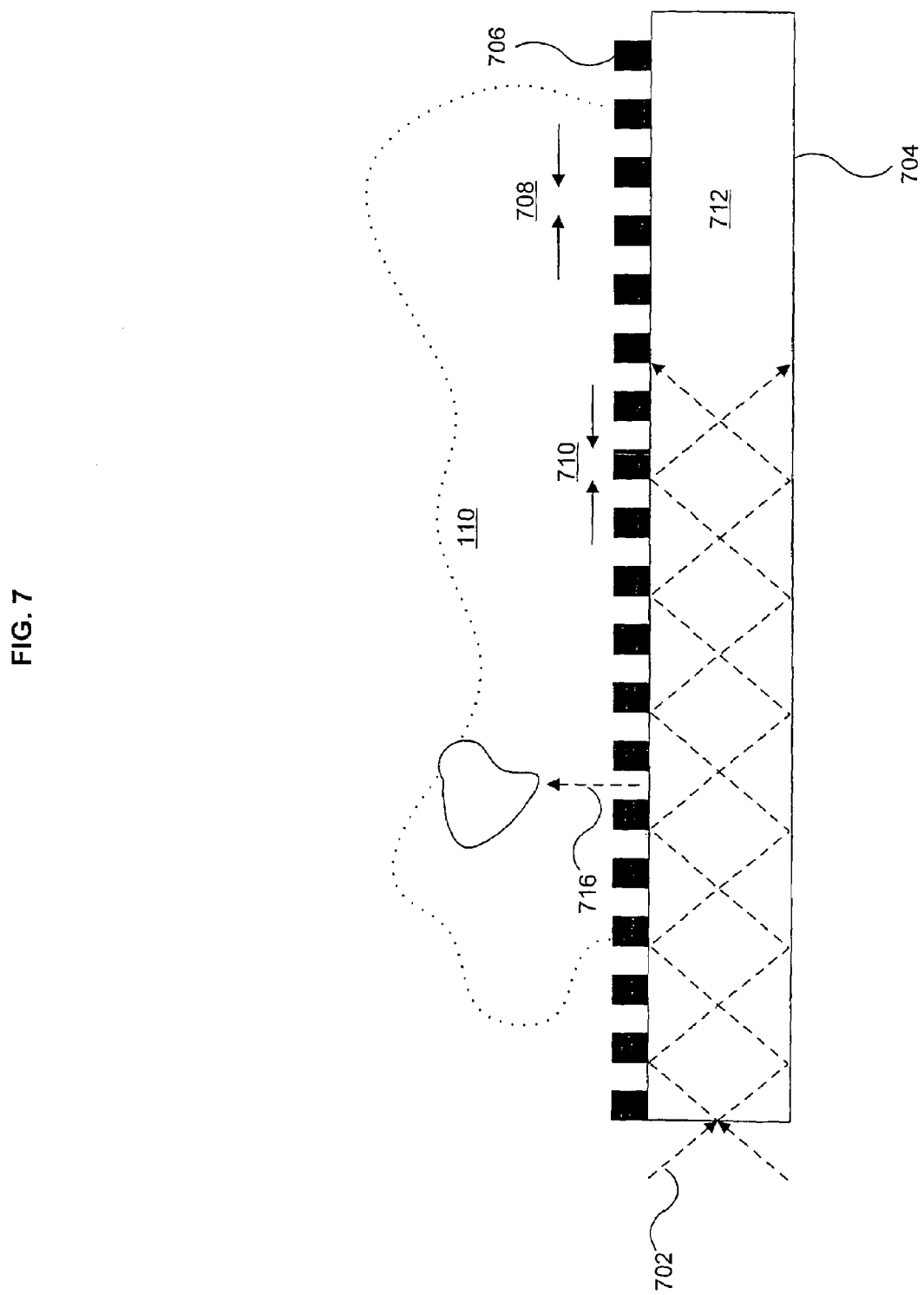
FIG. 7 shows a waveguide with a periodic array of conductive material.

In an arrangement shown in FIG. 7, a waveguide 704 such as an optical fiber or a 2d dielectric slab may include a patterned array of conductive material 706. Electromagnetic energy 702 is coupled into the waveguide 704 and propagates in the waveguide 704. In FIG. 7, the conductive material is configured with spacings 708 wherein the spacings are separated by a distance 710.

A patterned array of conducting material having an array of holes that are smaller than the wavelength of energy incident on them may have enhanced transmission of this energy through the holes, as described in W. L. Barnes, W. A. Murray, J. Dintinger, E. Devaux, and T. W. Ebbesen, "Surface Plasmon Polaritons and Their Role in the Enhanced Transmission of Light through Periodic Arrays of Subwavelength Holes in a Metal Film", Physical Review Letters, Volume 92, Number 10, Mar. 9, 2004, page 107401; S. C. Hohng, Y. C. Yoon, D. S. Kim, V. Malyarchuk, R. Müller, Ch. Lienau, J. W. Park, K. H. Yoo, J. Kim, H. Y Ryu, and Q. H. Park, "Light emission from the shadows: Surface plasmon nano-optics at near and far fields", Applied Physics Letters, Volume 81, Number 17, Oct. 21, 2002, pages 3239-3241; each which is incorporated herein by reference. A waveguide having such an array may therefore have enhanced transmission at certain wavelengths through the array 706. The wavelengths corresponding to enhanced transmission, as described in Hohng, may depend on the materials 712, 110 bordering the array. In FIG. 7 the array 706 is shown extending along the entire length of the waveguide 704, but in other configurations the array may extend over only a portion of the waveguide 704. The spacings 708 are described as being sub-wavelength, but transmission of energy 716 may occur in configurations having apertures that are larger than the wavelength of transmitted energy 716.

Although FIG. 7 shows a patterned array of conductive material 706, in another embodiment the dimension of the inner material 712 may be configured to vary, possibly in a periodic or semi-periodic way. The variations may produce a surface having substantially square-wave variations similar to that shown in FIG. 7, or the variations may produce a different kind of pattern such as a substantially sine-wave variation or another kind of variation. In such an embodiment, the conductive material 706 may also have a thickness that varies, possibly periodically or semi-periodically, or the conductive material 706 may have a substantially uniform thickness.

Plasmons may be produced on a boundary between two materials when the real parts of their dielectric constants $\in$ and $\in'$ have different signs, such as in areas where the conductive layer 104 and the material 110 are in contact. For example, in the periodic or semiperiodic arrangement shown in FIG. 7, plasmon energy can interact with the interaction material 110 in a corresponding periodic or semiperiodic pattern. Moreover, in configurations such as those shown in FIGS. 4 and 6 it may be possible to produce plasmons or electromagnetic energy in a defined spatial extent. These configurations may allow plasmon energy to be distributed through a reaction area in a selected pattern, and may produce localized reactions, may produce reactions that have asymmetric spatial patterns, or may catalyze a reaction in a distributed fashion. Moreover, in configurations where plasmons are produced in defined areas along the waveguide, the energy may propagate further and/or with less dissipation in the guide than in configurations where the energy is converted to plasmons along the entire length of the waveguide.

Such targeted spatial distributions of plasmons and/or electromagnetic energy may be useful, for example, in photocatalytic lithography, as described in J. P. Bearinger, A. L. Hiddessen, K. J. J. Wu, A. T. Christian, L. C. Dugan, G. Stone, J. Camarero, A. K. Hinz and J. A. Hubbell, "Biomolecular Patterning via Photocatalytic Lithography", in Nanotech, 2005 Vol. 1, "Technical Proceedings of the 2005 NSTI Nanotechnology Conference and Trade Show, Volume 1", Chapter 7: DNA, Protein, Cells and Tissue Arrays; and in Jae P. Lee and Myung M. Sung, "A new patterning method using photocatalytic lithography and selective atomic layer deposition", Journal of the American Chemical Society, Volume 126, Number 1, Jan. 14, 2004, pages 28-29, each of which is incorporated herein by reference. Targeted spatial distributions of plasmons and/or electromagnetic energy may also be useful in applications where the interaction material 110 is distributed in an array, where the interaction material 110 may comprise different kinds or different amounts of material in different parts of the array, or where it is desired to control the amount of energy delivered to the material 110 according to spatial position.

In general, photocatalysis has many applications and the embodiments shown in FIGS. 1-7 have a wide variety of applications. Some applications of photocatalysis are described in Akira Fujishima, "Discovery and applications of photocatalysis—Creating a comfortable future by making use of light energy", Japan Nanonet Bulletin, Issue 44, May 12, 2005, which is incorporated herein by reference. These include the extraction of hydrogen from water for use as a clean energy source, oxidation of materials (potentially for disinfection and deodorization or for cleanup of toxic sites), and creating surfaces with "superhydrophilicity" and self-cleaning properties. A wide range of applications is detailed in Fujishima, and one skilled in the art may apply the embodiments shown in FIGS. 1-7 to applications of photocatalysis, including those applications described above and detailed in Fujishima. For example, the photocatalyst layer 502 in FIG. 5 may include titanium dioxide and the material 110 may, in one embodiment, be water, where the photocatalytic process is designed to remove impurities in the water.

Some of the embodiments in FIGS. 1-7 include materials that are patterned, potentially on the nanoscale. For example, FIG. 7 shows a metal grating having a periodicity that may be fabricated using techniques such as lithography and/or deposition of material. Such techniques are known to those skilled in the art and may produce features having sizes on the order of nanometers or possibly less. These techniques may be used to fabricate features in a regular array, a desired pattern, or a single defect. In the case of a single defect, the size of the defect may be on the order of a nanometer, as described in Kik.

In this disclosure, references to "optical" elements, components, processes or other aspects, as well as references to "light" may also relate in this disclosure to so-called "near-visible" light such as that in the near infrared, infra-red, far infrared and the near and far ultra-violet spectrums. Moreover, many principles herein may be extended to many spectra of electromagnetic radiation where the processing, components, or other factors do not preclude operation at such frequencies, including frequencies that may be outside ranges typically considered to be optical frequencies.

The foregoing detailed description has set forth various embodiments of the devices and/or processes via the use of block diagrams, diagrammatic representations, and examples. Insofar as such block diagrams, diagrammatic representations, and examples contain one or more functions and/or operations, it will be understood as notorious by those within the art that each function and/or operation within such block diagrams, diagrammatic representations, or examples can be implemented, individually and/or collectively, by a wide range of hardware, materials, components, or virtually any combination thereof.

Those skilled in the art will recognize that it is common within the art to describe devices and/or processes in the fashion set forth herein, and thereafter use standard engineering practices to integrate such described devices and/or processes into elements, processes or systems. That is, at least a portion of the devices and/or processes described herein can be integrated into optical, RF, X-ray, or other electromagnetic elements, processes or systems via a reasonable amount of experimentation.

Those having skill in the art will recognize that a typical optical system generally includes one or more of a system housing or support, and may include electrical components, alignment features, one or more interaction devices, such as a touch pad or screen, control systems including feedback loops and control motors (e.g., feedback for sensing lens position and/or velocity; control motors for moving/distorting lenses to give desired focuses). Such systems may include image processing systems, image capture systems, photolithographic systems, scanning systems, or other systems employing optical, RF, X-ray or other focusing or refracting elements or processes.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A system comprising:
A first waveguide, said first waveguide being configured to carry energy from a first location to a second location, said first waveguide including a first inner region and a first outer region, said first outer region having a first outer surface;
A plasmon generator coupled to said first waveguide and operative to produce plasmons; and
An interaction material proximate to said second location and responsive to said plasmons to react chemically.

2. The system of claim 1 wherein the plasmon generator includes a structure patterned to produce plasmons.

3. The system of claim 2 wherein the structure patterned to produce plasmons includes a grating.

4. The system of claim 2 wherein the structure patterned to produce plasmons includes an array of nanoparticles.

5. The system of claim 4 wherein the array of nanoparticles is configured to deliver energy to a resist.

6. The system of claim 4 wherein the array is a substantially regular array.

7. The system of claim 1 further including a second material in intimate contact with the first outer surface, wherein the second material includes the interaction material.

8. The system of claim 1 wherein the interaction material includes a photocatalyst, and wherein the photocatalyst includes a semiconductor.

9. The system of claim 1 wherein the first outer surface is configured to support the plasmons.

10. The system of claim 1 wherein the first outer region covers a portion of the first inner region.

11. The system of claim 1 wherein the thickness of the first outer region varies.

12. The system of claim 11 wherein the first outer region has periodic defects of material, said defects having a width, wherein the thickness of the first outer region is substantially zero at the position of the defects.

13. The system of claim 12 wherein the plasmons are configured to have an energy band, and wherein said energy band is a function of the width of the defects.

14. The system of claim 1 wherein the thickness of the first inner region varies.

15. The system of claim 14 wherein the thickness of the first inner region varies substantially periodically.

16. The system of claim 1 wherein the first outer region includes a metal.

17. The system of claim 16 wherein the metal includes silver.

18. The system of claim 16 wherein the metal includes copper.

19. The system of claim 1 wherein the first outer region includes an aperture.

20. The system of claim 19 wherein the first outer region includes a conductor.

21. The system of claim 20 wherein the conductor includes a metal.

22. The system of claim 19 wherein the first outer region includes a grating structure proximate to the aperture.

23. The system of claim 1 wherein the first outer region includes vanadium dioxide.

24. A system comprising:
A first waveguide, said first waveguide being configured to carry energy from a first location to a second location, said first waveguide comprising an optical fiber;
A plasmon generator coupled to said first waveguide; and
An interaction material proximate to said second location and responsive to plasmons to react chemically.

25. The system of claim 24 wherein the optical fiber includes a gradient index of refraction.

26. The system of claim 24 wherein the optical fiber includes a discontinuous index of refraction.

27. The system of claim 24 wherein the optical fiber includes quartz.

28. A system comprising:
A first waveguide, said first waveguide being configured to carry energy from a first location to a second location, said waveguide including a conductor configured to carry terahertz energy;

A plasmon generator coupled to said first waveguide; and

An interaction material proximate to said second location and responsive to plasmons to react chemically.

29. A system comprising:

A first waveguide, said first waveguide being configured to carry energy from a first location to a second location, said first waveguide including a photonic band gap material;

A plasmon generator coupled to said first waveguide; and

An interaction material proximate to said second location and responsive to plasmons to react chemically.

30. A system comprising:

A first waveguide, said first waveguide being configured to carry energy from a first location to a second location, said first waveguide being configured to support electromagnetic energy in a first wavelength band;

A plasmon generator coupled to said first waveguide; and

An interaction material proximate to said second location and responsive to plasmons to react chemically.

31. The system of claim 30 wherein the first wavelength band includes infrared wavelengths.

32. The system of claim 30 wherein the first wavelength band includes visible wavelengths.

33. The system of claim 30 wherein the first wavelength band includes ultraviolet wavelengths.

34. The system of claim 30 wherein the first wavelength band includes microwave wavelengths.

* * * * *